(12) United States Patent
Liu et al.

(10) Patent No.: US 8,416,695 B2
(45) Date of Patent: Apr. 9, 2013

(54) METHOD, DEVICE AND SYSTEM FOR NETWORK INTERCEPTION

(75) Inventors: Tingyong Liu, Shenzhen (CN); Guoqing Liu, Shenzhen (CN); Wenda Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 495 days.

(21) Appl. No.: 12/478,307

(22) Filed: Jun. 4, 2009

(65) Prior Publication Data

US 2009/0323536 A1  Dec. 31, 2009

(30) Foreign Application Priority Data

Jun. 30, 2008  (CN) .......................... 2008 1 0125272
Mar. 18, 2009  (WO) ................ PCT/CN2009/070875

(51) Int. Cl.
*H04K 1/00* (2006.01)
*G06F 7/04* (2006.01)
*H04L 29/06* (2006.01)

(52) U.S. Cl. ........... 370/241; 380/247; 726/26; 713/167

(58) Field of Classification Search .................. 709/203, 709/219, 223, 230, 246, 259, 310, 312; 370/241, 370/241.1, 242, 259; 380/247–250; 726/26, 726/27, 29, 30; 713/164, 167, 176, 177, 713/180, 188
See application file for complete search history.

(56) References Cited

U.S. PATENT DOCUMENTS

| | | | | |
|---|---|---|---|---|
| 5,884,025 A * | 3/1999 | Baehr et al. | ...................... | 726/13 |
| 6,530,024 B1 * | 3/2003 | Proctor | ........................... | 726/23 |
| 7,757,268 B2 * | 7/2010 | Gupta et al. | ...................... | 726/1 |
| 2002/0124067 A1 * | 9/2002 | Parupudi et al. | ............... | 709/223 |
| 2003/0145226 A1 * | 7/2003 | Bruton et al. | .................. | 713/201 |
| 2004/0064727 A1 * | 4/2004 | Yadav | ........................... | 713/201 |
| 2004/0268149 A1 * | 12/2004 | Aaron | ........................... | 713/201 |
| 2005/0028006 A1 * | 2/2005 | Leser et al. | .................... | 713/200 |
| 2006/0037077 A1 * | 2/2006 | Gadde et al. | .................... | 726/23 |
| 2006/0120526 A1 * | 6/2006 | Boucher et al. | ................ | 380/247 |

(Continued)

FOREIGN PATENT DOCUMENTS

| | | |
|---|---|---|
| CN | 1564525 A | 1/2005 |
| CN | 101072174 A | 11/2007 |
| CN | 101179449 A | 5/2008 |

OTHER PUBLICATIONS

International Search Report in corresponding PCT Application No. PCT/CN2009/070875 (Jul. 2, 2009).

(Continued)

*Primary Examiner* — Michael Thier
*Assistant Examiner* — Prince A Mensah
(74) *Attorney, Agent, or Firm* — Leydig, Voit & Mayer, Ltd.

(57) ABSTRACT

A method, a device, and a system for network interception are provided. The method for network interception includes the following steps. A matching rule obtained by parsing an interception policy. Received data are selected by adopting a deep packet inspection (DPI) according to the matching rule so as to obtain an interception result, in which the received data are obtained by adopting data preprocessing to filter packet data according to a service customizing rule obtained by parsing the interception policy. The system for network interception includes a service probe server (SPS) and a service analyze server (SAS). Thus, various packet data services transmitted over an Internet protocol (IP) network can be intercepted.

11 Claims, 4 Drawing Sheets

U.S. PATENT DOCUMENTS

2009/0037594 A1* 2/2009 Sever et al. .................. 709/230
2009/0100506 A1* 4/2009 Whang et al. ..................... 726/4
2009/0296685 A1* 12/2009 O'Shea et al. ................ 370/351

OTHER PUBLICATIONS

Written Opinion of the International Searching Authority in corresponding PCT Application No. PCT/CN2009/070875 (Jul. 2, 2009).

$1^{st}$ Office Action in corresponding Chinese Application No. 200810125272.9 (Mar. 24, 2011).

$2^{nd}$ Office Action in corresponding Chinese Patent Application No. 200810125272.9 (Feb. 15, 2012).

* cited by examiner

METHOD, DEVICE AND SYSTEM FOR NETWORK INTERCEPTION

CROSS-REFERENCE TO RELATED APPLICATIONS

This application claims the benefit of priority to Chinese Patent Application No. 200810125272.9, filed on Jun. 30, 2008, and International Application No. PCT/CN2009/070875, filed on Mar. 18, 2009. The contents of the above identified applications are incorporated herein by reference in their entireties.

FIELD OF THE TECHNOLOGY

The present invention relates to a communication technology field, particularly to a method, device and system for network interception.

BACKGROUND

Currently, various new communication techniques based on an internet protocol (IP) network have become hot issues under research. As for a voice over Internet protocol (VOIP) technique, analogue voice stream signals are transmitted in the IP network environment in a form of grouped data after being compressed and packaged, which has the advantages incomparable by the traditional telephone. As the communication technology has been developed rapidly, the VOIP network is displacing a public switched telephone network (PSTN), and is approved by more and more people. In consideration of security and other reasons, relevant security department or some special units usually need to intercept the internal communications over network. In the prior art, a method for service interception is realized through saving and recovering the voice streams in the PSTN communication network in the prior art, so as to intercept the PSTN voice call.

During a process of realizing the present invention, the inventor(s) finds that the prior art at least has the following problems:

The prior interception technique is applicable to the PSTN network to intercept the voice streams in the PSTN network, but it is the grouped data that is transmitted over the VOIP network, so the method for intercepting the voice streams in the PSTN network in the prior art cannot be applied to the VOIP network at all, in other words, the voice data required to be intercepted in the VOIP network cannot be effectively obtained.

SUMMARY

The present invention provides a method, device and system for network interception so as to realize interception over an IP network.

An embodiment of the present invention provides a method for network interception in an embodiment, in which:

a matching rule obtained by parsing an interception policy; and received data are selected by adopting a deep packet inspection (DPI) according to the matching rule so as to obtain an interception result, in which the received data are obtained by adopting data preprocessing to filter packet data according to a service customizing rule obtained by parsing the interception policy.

An embodiment of the present invention further provides a service analyze server (SAS), which includes:

an interception policy processing unit adapted to parse an interception policy so as to obtain a service customizing rule and a matching rule; and a data selecting unit adapted to select data sent by a service probe server (SPS) by adopting a deep packet inspection (DPI) according to the matching rule obtained by the interception policy processing unit so as to obtain an interception result.

An embodiment of the present invention further provides a system for network interception, which includes an SPS and an SAS, in which the SPS is adapted to obtain packet data of an IP network, and filter the obtained packet data by using a data preprocessing technique according to a service customizing rule obtained by the SAS; and the SAS is adapted to parse an interception policy to obtain the service customizing rule and a matching rule, and select the data filtered by the SPS by adopting a deep packet inspection (DPI) according to the matching rule so as to obtain an interception result.

In the above technical solution, after obtaining the packet data of the IP network, the SPS firstly preprocesses the packet data, and then filters the packet data according to the service customizing rule. The SAS applies the DPI technique to further analyze the packet data filtered by the SPS, then selects the analysis result according to the matching rule, and finally obtains the required interception result, thereby realizing the interception over the IP network.

DETAILED DESCRIPTION

Firstly, a method for IP network interception according to an embodiment of the present invention is described, in which:

an exact matching rule obtained by parsing an interception policy is obtained; and received data are selected by adopting a deep packet inspection (DPI) according to the exact matching rule to obtain an interception result, in which the received data are obtained by adopting data preprocessing to filter packet data according to a service customizing rule obtained by parsing the interception policy.

The specific implementation of the present invention is described below in detail with reference to the accompanying drawings.

Figure 1:
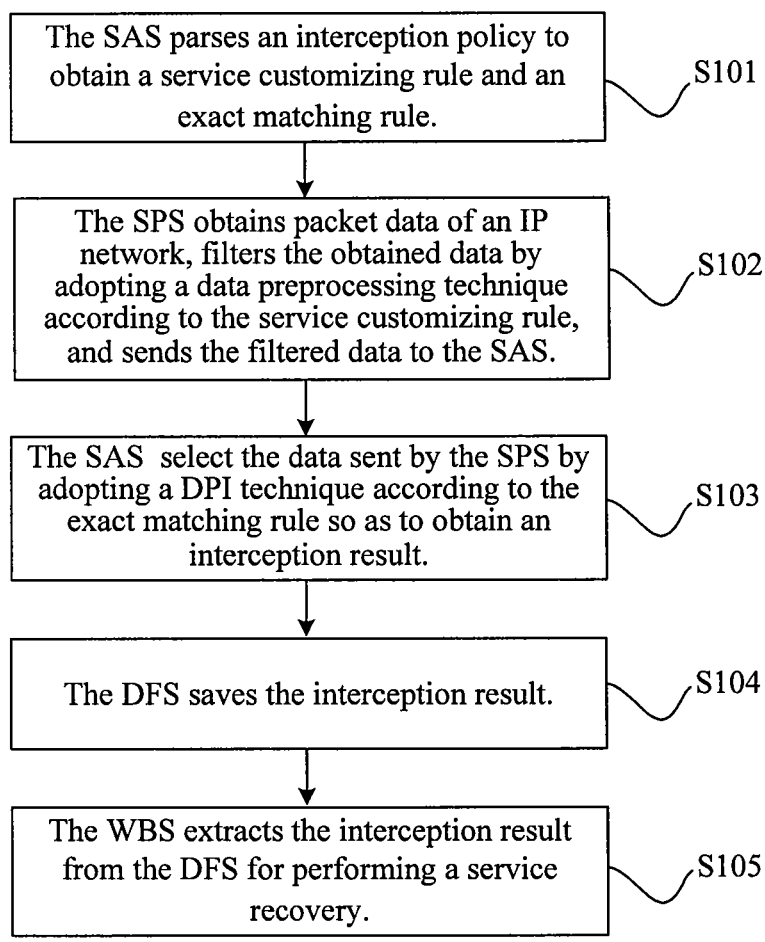
FIG. 1 is a schematic flow chart of a method for IP network interception according to an embodiment of the present invention.

FIG. 1 is a schematic flow chart of a method for IP network interception according to an embodiment of the present invention. The method includes:

Step 101: After receiving an interception policy, an SAS parses the interception policy to obtain a service customizing rule and an exact matching rule, and sends the service customizing rule to an SPS. The service customizing rule corresponds to basic information of a service to be intercepted, including a media access control (MAC) address, an IP address, a transmission control protocol (TCP)/user datagram protocol (UDP) port, service type, and the like. The exact matching rule corresponds to specific information of the service to be intercepted, including a user name, an account, an Email address, a phone number, and the like.

Step 102: The SPS obtains packet communication data of the IP network in a sniffing manner, and firstly preprocesses the packet data. The SPS identifies the basic service information of the packet data through Layer 2-4 protocol analysis or packet feature matching, and then, the SPS filters the data whose basic service information is not matched with the rule according to the service customizing rule and sends the filtered data to the SAS continuously.

Step 103: The SAS adopts a DPI technique to analyze intercept related information (IRI) of the data sent by the SPS to obtain the service specific information corresponding to the data. The IRI is calling control information related to content of communication (CC) in the packet data of the IP network, and the IRI and the CC of the same service data are associated with each other through a unique feature identifier. Then, an analysis result is selected according to the exact matching rule obtained in Step 101 so as to match the IRI of the service data to be intercepted exactly. Finally, the CC corresponding to the IRI is obtained by associating with the unique feature identifier, and both the IRI and the CC of the service data to be intercepted are taken as the interception result.

The interception policy in Step 101 includes an IP address or an account to be intercepted, and the interception policy may be sent to the SAS after being configured by a web server (WBS).

In order to further perform a service recovery on the interception result, this embodiment further includes the following steps:

Step 104: A database and files server (DFS) saves the interception result. The CC in the interception result is saved in the files server and the IRI is saved in the database, so as to retrieve the intercepted service through the association relation between the IRI and the CC conveniently. In the DFS storage system, the original storage format of the interception result maintains unchanged to generate the evidence until the interception result is filed to an external storage medium or is deleted. The storage capacity is determined depending upon the number of the intercepted targets, which is usually from hundreds of Gbits to several Tbits.

Step 105: Interception personnel log in the WBS, and perform the service recovery on the interception result saved in the DFS. The WBS extracts one copy of the interception result from the DFS, and performs the recovery process or generates an analysis report for the interception personnel to review.

The method for the IP network interception provided by the above embodiment is applicable to non-real-time interception of services in the IP network, and for services requiring the real-time interception, the WBS obtains the interception result directly from the front end system SAS to perform the service recovery.

Figure 2:
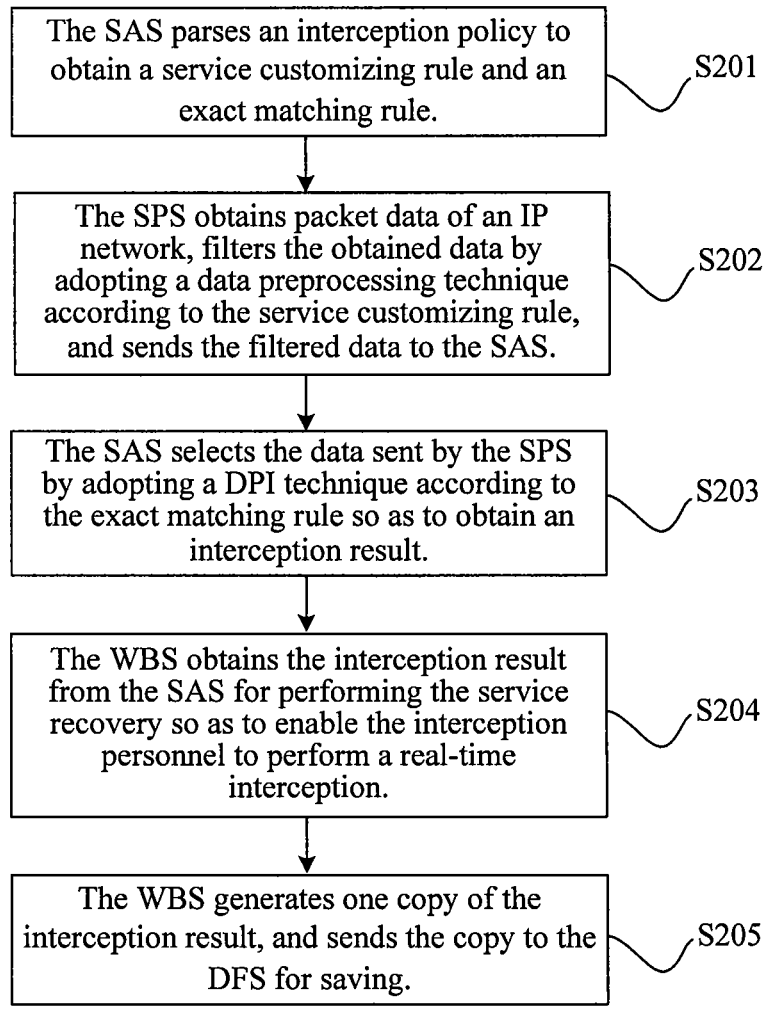
FIG. 2 is a schematic flow chart of another method for IP network interception according to an embodiment of the present invention.

FIG. 2 is a schematic flow chart of another method for IP network interception according to an embodiment of the present invention. The method includes the following steps:

Step 201-Step 203 are the same as Step 101-Step 103.

Step 204: The WBS obtains the interception result directly from the SAS and performs the service recovery for the interception personnel to perform the real-time interception.

If a backup process needs to be performed on the real-time intercepted data, this embodiment further includes:

Step 205: The WBS generates one copy of the real-time interception result, and sends the copy to the DFS for saving, which is provided for the subsequent analysis or serves as the evidence. The process for saving the copy of the interception result is similar to that of S104, so it is not described here.

In the above two embodiments, the interception personnel may carry out management and maintenance on the entire interception system by logging in the WBS, which includes delivering a control instruction to coordinate the operation of each part of the interception system, and generating operations, maintenance and running log of the interception system.

It should be noted that, the interception personnel may log in the WBS through a web client (WBC) so as to perform the related operations, which does not affect the realization of the present invention.

Thus, in the above embodiment, for the packet data transmitted over the IP network, the basic information of the data is firstly identified by adopting the data preprocessing technique, then the data are filtered primarily, and then the data are analyzed by adopting the DPI technique to realize an accurate selection, thereby obtaining the required interception result. The interception personnel may log in the WBS, so as to effectively save, recover and manage the interception result, thereby realizing an interception of the IP network.

In addition, various packet data services transmitted over the IP network, including text, image, audio, and video, may be intercepted, which offers more effective intercepting means for the interception personnel.

Figure 3:
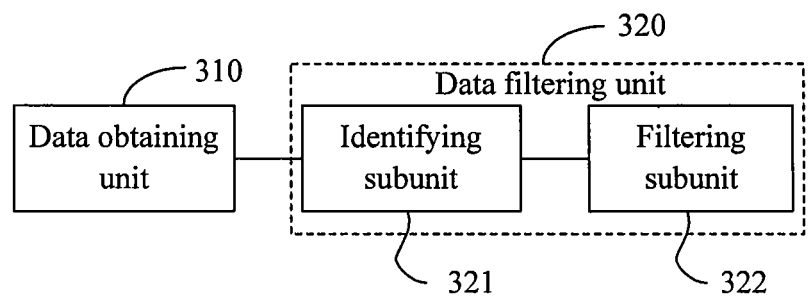
FIG. 3 is a schematic structural view of an SPS according to an embodiment of the present invention.

The present invention provides an SPS in an embodiment. FIG. 3 is a schematic structural view of an SPS according to an embodiment of the present invention.

The SPS includes:

a data obtaining unit 310 adapted to obtain packet data of an IP network; and a data filtering unit 320 adapted to filter the packet data obtained by the data obtaining unit 310 by applying a data preprocessing technique according to a service customizing rule.

The data filtering unit 320 includes:

an identifying subunit 321 adapted to identify the basic service information of the packet data obtained by the data obtaining unit 310 by applying the data preprocessing technique; and a filtering subunit 322 adapted to filter the packet data according to an identifying result of the identifying subunit 321 and the service customizing rule.

Figure 4:
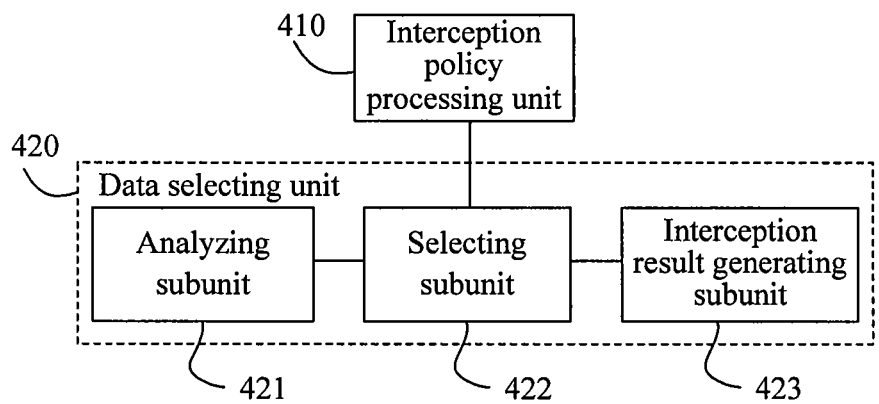
FIG. 4 is a schematic structural view of an SAS according to an embodiment of the present invention.

Embodiments of the present invention also provide an SAS. FIG. 4 is a schematic structural view of an SAS according to an embodiment of the present invention, and the SAS includes:

an interception policy processing unit 410 adapted to parse an interception policy so as to obtain the service customizing rule and an exact matching rule; and a data selecting unit 420 adapted to select data sent by the SPS by adopting the DPI according to the exact matching rule obtained by the interception policy processing unit 410 so as to obtain an interception result.

The data selecting unit 420 includes:

an analyzing subunit 421 adapted to analyze the data sent by the SPS by adopting the DPI technique;

a selecting subunit 422 adapted to select an analysis result of the analyzing subunit 421 according to the exact matching rule obtained by the interception policy processing unit 410 so as to match an IRI of a service data to be intercepted exactly; and an interception result generating subunit 423 adapted to generate the interception result according to the IRI of the service data to be intercepted obtained by the selecting subunit 422.

Figure 5:
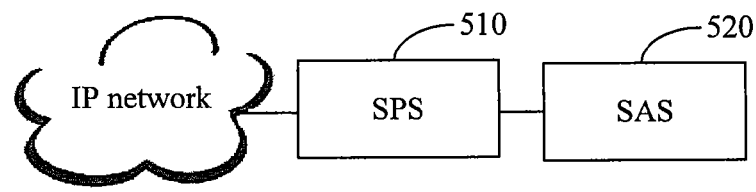
FIG. 5 is a schematic structural view of a system for IP network interception according to an embodiment of the present invention.

Embodiments of the present invention also provide a system for IP network interception. FIG. 5 is a schematic structural view of a system for IP network interception according to an embodiment of the present invention. Referring to FIG. 5, the system includes an SPS 510 and an SAS 520.

The SPS 510 is adapted to obtain packet data of an IP network, and filter the obtained packet data by adopting a data preprocessing technique according to a service customizing rule obtained by the SAS 520.

The SAS 520 is adapted to parse an interception policy to obtain the service customizing rule and an exact matching rule, send the service customizing rule to the SPS 510, and select the data filtered by the SPS 510 by adopting a DPI technique according to the exact matching rule so as to obtain an interception result.

Figure 6:
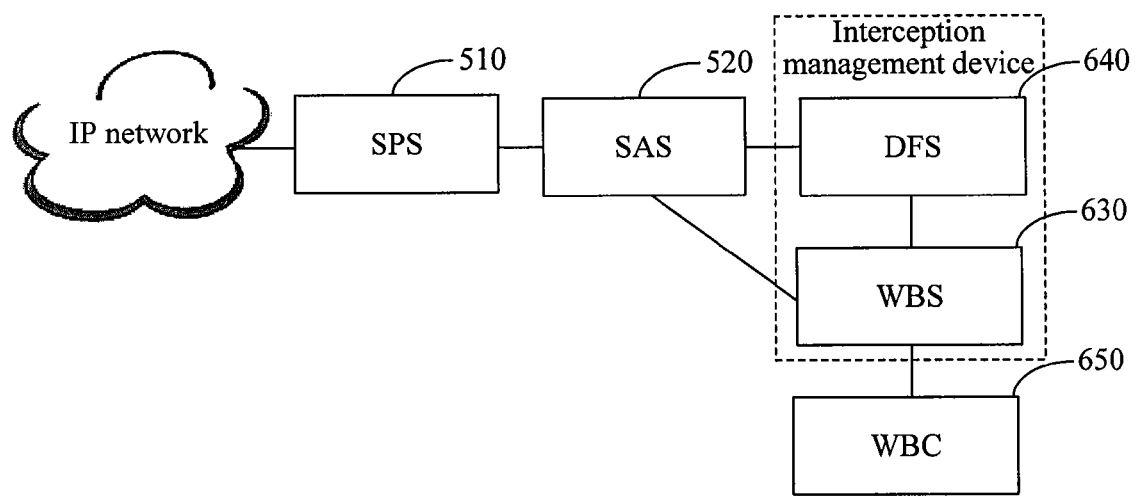
FIG. 6 is another schematic structural view of the system for IP network interception according to an embodiment of the present invention.

In order to perform a service recovery on the interception result, the interception system further includes an interception management device. FIG. 6 is another schematic structural view of the system for IP network interception according to an embodiment of the present invention. The difference between FIG. 5 and FIG. 6 lies in: FIG. 6 further includes an interception management device, and the interception management device includes a WBS 630 and a DFS 640;

the WBS 630 is adapted to perform the service recovery on the interception result; and the DFS 640 is adapted to store the interception result.

As for the non-real-time service, the interception result is saved in the DFS 640 firstly, and when the interception is required, the WBS 630 extracts the interception result from the DFS 640 to perform the service recovery. For the service requiring the real-time interception, the WBS 630 obtains the interception result directly from the SAS 520 to perform the service recovery for the interception personnel to perform the real-time interception. If a backup process needs to be performed on the interception result, the WBS 630 may generate one copy of the interception result during the service recovery, and send the copy to the DFS 640 for saving.

The WBS 630 may be further adapted to configure the interception policy, manage and maintain the running of the overall interception system. The DFS 640 may be further adapted to save the configuration information, running maintenance log of the system, the account and authority of the interception personnel, as well as other information.

To facilitate operations of the interception personnel, the interception system may further include:

a WBC 650, adapted to provide a user interface to the interception system, which is usually a terminal with a graphic user interface (GUI) to serve as a user interface for the entire interception system, wherein the interception personnel log in the WBS 630 remotely through the WBC 650, and perform service recovery, or system management and maintenance, and the like.

The embodiments of the device and the system are described relatively simple because they correspond to the embodiment of the method basically, and related parts may refer to the descriptions of the corresponding parts in the embodiment of the method. The above described embodiments of the device and the system are merely signifying embodiments, in which the units described as separated parts may be or may not be physically separated, the parts shown as units may be or may not be physical units, in other words, may be located on a certain position or may be distributed on a plurality of network units. A part of or all the modules may be selected to realize the objective of the solution of the embodiment depending upon the practical demands, which can be understood and implemented by those of ordinary skill in the art without requiring the creative work.

Those of ordinary skill in the art may appreciate that, all or a part of the steps for realizing the embodiment of the method may be finished by the relevant hardware instructed by a program, and the program may be stored in a computer-readable storage medium. When the program is executed, the steps of the embodiments of the method are performed. The storage medium includes a read only memory (ROM), a random access memory (RAM), a magnetic disk, an optical disk, or any medium capable of storing program codes.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A method for network interception, comprising:

obtaining a matching rule by parsing an interception policy;

analyzing received data by adopting a deep packet inspection (DPI);

selecting an analysis result according to the matching rule so as to obtain intercept related information (IRI) of service data to be intercepted; and obtaining content of communication (CC) corresponding to the IRI of the service data to be intercepted by associating with a unique feature identifier, and taking the IRI of the service data to be intercepted and the corresponding CC as an interception result, wherein the received data are obtained by adopting data preprocessing to filter packet data according to a service customizing rule obtained by parsing the interception policy.

2. The method according to claim 1, further comprising: performing a service recovery on the interception result.

3. The method according to claim 1, wherein the matching rule corresponds to specific information of a service to be intercepted, the specific information of the service to be intercepted comprises a user name, an account, an Email address, and a phone number.

4. The method according to claim 1, wherein the service customizing rule corresponds to basic information of the service to be intercepted, the basic information of the service to be intercepted comprises a media access control (MAC) address, an IP address, a transmission control protocol (TCP)/user datagram protocol (UDP) port, and service type.

5. A service analyze server (SAS), comprising:

an interception policy processing unit, adapted to parse an interception policy so as to obtain a service customizing rule and a matching rule; and a data selecting unit, comprising:

an analyzing subunit, adapted to analyze data sent by a service probe server (SPS) by adopting a deep packet inspection (DPI);

a selecting subunit, adapted to select an analysis result of the analyzing subunit according to the matching rule obtained by the interception policy processing unit so as to obtain intercept related information (IRI) of service data to be intercepted; and an interception result generating subunit, adapted to generate an interception result according to the IRI of the service data to be intercepted obtained by the selecting subunit, wherein the data sent by the SPS are obtained by the SPS by adopting data preprocessing to filter packet data according to the service customizing rule obtained by parsing the interception policy.

6. A system for network interception, comprising a service probe server (SPS) and a service analyze server (SAS), wherein the SPS is adapted to obtain packet data of an Internet protocol (IP) network and filter the obtained packet data by adopting a data preprocessing technique according to a service customizing rule obtained by the SAS; and the SAS is adapted to parse an interception policy to obtain the service customizing rule and a matching rule, and select the data filtered by the SPS by adopting a deep packet inspection (DPI) according to the matching rule so as to obtain an interception result, wherein the interception result comprises intercept related information (IRI) of service data to be intercepted by selecting the data filtered by the SPS according to the matching rule and content of communication (CC) corresponding to the IRI.

7. The system for network interception according to claim 6, further comprising:

a database, adapted to store the IRI; and a files server (DFS), adapted to store the CC corresponding to the IRI.

8. The system for network interception according to claim 6, further comprising:

a web server (WBS), adapted to perform a service recovery on the interception result.

9. The system for network interception according to claim 8, further comprising:

a web client (WBC), adapted to provide a user interface to the system for network interception for interception personnel to log in the WBS through the WBC so as to perform the service recovery on the interception result.

10. The system for network interception according to claim 6, further comprising:

a web server (WBS), adapted to perform a service recovery on the interception result.

11. The system for network interception according to claim 10, further comprising:

a web client (WBC), adapted to provide a user interface to the system for network interception for interception personnel to log in the WBS through the WBC so as to perform the service recovery on the interception result.

* * * * *

UNITED STATES PATENT AND TRADEMARK OFFICE
CERTIFICATE OF CORRECTION

| | | |
|---|---|---|
| PATENT NO. | : 8,416,695 B2 | Page 1 of 1 |
| APPLICATION NO. | : 12/478307 | |
| DATED | : April 9, 2013 | |
| INVENTOR(S) | : Liu et al. | |

It is certified that error appears in the above-identified patent and that said Letters Patent is hereby corrected as shown below:

On the Title Page, Item (73) Assignee should read:

-- Chengdu Huawei Symantec Technologies Co., Ltd.
Chengdu (CH) --.

Signed and Sealed this
Tenth Day of September, 2013

Teresa Stanek Rea
*Acting Director of the United States Patent and Trademark Office*